(12) United States Patent
Pautis et al.

(10) Patent No.: US 12,129,041 B2
(45) Date of Patent: Oct. 29, 2024

(54) ENGINE PYLON FOR COUPLING A JET ENGINE TO A WING OF AN AIRCRAFT

(71) Applicant: Airbus Operations SAS, Toulouse (FR)

(72) Inventors: Olivier Pautis, Toulouse (FR); Jonathan Blanc, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 4 days.

(21) Appl. No.: 17/988,862

(22) Filed: Nov. 17, 2022

(65) Prior Publication Data
US 2023/0159179 A1 May 25, 2023

(30) Foreign Application Priority Data

Nov. 19, 2021 (FR) ...................................... 2112256

(51) Int. Cl.
| | |
|---|---|
| *B64D 27/40* | (2024.01) |
| *F01D 25/28* | (2006.01) |
| *F02C 7/20* | (2006.01) |
| *B64D 27/16* | (2006.01) |

(52) U.S. Cl.
CPC ............. *B64D 27/40* (2024.01); *F01D 25/28* (2013.01); *F02C 7/20* (2013.01); *B64D 27/16* (2013.01); *B64D 27/402* (2024.01)

(58) Field of Classification Search
CPC . B64D 2027/264; B64D 27/40; B64D 27/402
See application file for complete search history.

(56) References Cited

U.S. PATENT DOCUMENTS

| | | | |
|---|---|---|---|
| 9,248,921 B2 | 2/2016 | West | |
| 2008/0315033 A1* | 12/2008 | Diochon | B64D 27/26 244/54 |
| 2009/0212155 A1* | 8/2009 | Huggins | B64D 27/26 244/54 |
| 2010/0090056 A1* | 4/2010 | Gardes | B64D 27/40 244/54 |

(Continued)

FOREIGN PATENT DOCUMENTS

| | | | | |
|---|---|---|---|---|
| FR | 3042778 A1 | 4/2017 | | |
| FR | 3059648 A1 * | 6/2018 | ............. | B29C 64/00 |

(Continued)

OTHER PUBLICATIONS

French Search Report dated Jun. 3, 2022; priority document.

*Primary Examiner* — Todd E Manahan
*Assistant Examiner* — Marc J Amar
(74) *Attorney, Agent, or Firm* — Greer, Burns & Crain, Ltd.

(57) ABSTRACT

An engine pylon for an aircraft and comprising an inverted U-shaped upper spar with two lateral walls, a U-shaped lower spar with two lateral walls, where the free ends of the lateral walls of the spars are adjacent, an arrangement to the free end of a lateral wall of one spar to the free end of the lateral wall of the other spar, and ribs between the spars where each has a top end fixed to the lateral walls of the upper spar and a bottom end fixed to the lower spar. Such an engine pylon thus offers a reduced number of component parts and a single row of fixings per side, enabling a saving in weight and in assembly time.

9 Claims, 5 Drawing Sheets

(56) References Cited

U.S. PATENT DOCUMENTS

| | | | |
|---|---|---|---|
| 2011/0168836 A1* | 7/2011 | Sanz Martinez | B64D 27/14 244/119 |
| 2015/0013142 A1* | 1/2015 | West | B64D 27/26 29/525.08 |
| 2015/0321766 A1* | 11/2015 | Howe | B64D 27/26 244/54 |
| 2016/0221682 A1 | 8/2016 | Pautis et al. | |
| 2019/0112074 A1* | 4/2019 | Dostes | B64D 27/26 |
| 2019/0135445 A1* | 5/2019 | Combes | B64D 27/40 |
| 2020/0269987 A1* | 8/2020 | Gleize | B64D 29/02 |
| 2021/0101689 A1 | 4/2021 | Blanc et al. | |
| 2022/0119122 A1* | 4/2022 | West | B64D 27/26 |

FOREIGN PATENT DOCUMENTS

| | | |
|---|---|---|
| FR | 3069527 A1 | 2/2019 |
| FR | 3072364 A1 | 4/2019 |
| FR | 3069527 B1 * | 8/2019 |
| FR | 3099464 A1 | 2/2021 |

\* cited by examiner

ENGINE PYLON FOR COUPLING A JET ENGINE TO A WING OF AN AIRCRAFT

CROSS-REFERENCES TO RELATED APPLICATIONS

This application claims the benefit of the French patent application No. 2112256 filed on Nov. 19, 2021, the entire disclosures of which are incorporated herein by way of reference.

FIELD OF THE INVENTION

The present invention relates to an engine pylon for mounting a jet engine beneath the wing of an aircraft, and to an aircraft comprising a jet engine, a wing and such an engine pylon for mounting the jet engine beneath the wing.

BACKGROUND OF THE INVENTION

Usually, for an aircraft, a propulsion unit comprises a jet engine which is fixed beneath a wing of the aircraft using an engine pylon.

First connecting means fix the jet engine to the engine pylon. These connecting means conventionally comprise a forward engine mount, a rear engine mount and reaction rods which absorb the thrust forces generated by the jet engine.

Second connecting means fix the engine pylon to the wing. These second connecting means react and absorb the bending moments and shear forces at the interface between the engine pylon and the wing. An example of such an arrangement is described in document US-A-2016/0221682.

According to one embodiment of the prior art, the engine pylon is made up of a primary structure allowing load transfer and formed of a box structure made up of an upper spar, of a lower spar and of two lateral panels connecting the two spars and of internal ribs distributed along the box structure. Producing the box structure therefore consists in producing four rows of fish-plating, namely one row between the upper spar and each lateral panel and one row between the lower spar and each lateral panel.

According to another embodiment of the prior art, the engine pylon is made up of a primary structure formed of a box structure made up of an upper spar, of a lower spar and of two lateral panels connecting the two spars, of internal ribs distributed along the box structure and of four brackets distributed at the four corners of the box structure. Creating the box structure then consists in producing eight rows of fish-plating, namely two rows per bracket.

The primary structure is covered by a secondary structure which forms an exterior fairing having an aerodynamic exterior surface and under which systems (fuel, electric, oil, etc. systems) can be installed.

Even though such installations are satisfactory, they are relatively heavy because all of the elements are made of metal and the assembly process is complex with various layers needing to be stacked and component parts needing to be assembled sequentially one after another.

SUMMARY OF THE INVENTION

It is an objective of the present invention to propose an engine pylon for mounting a jet engine beneath the wing of an aircraft where the engine pylon has a particular assembly enabling a saving in weight and in assembly time.

To this end, what is proposed is an engine pylon for mounting a jet engine beneath a wing of an aircraft, the engine pylon comprising:

an upper spar having an inverted U-shaped profile with a roof and two lateral walls extending downwards from the roof, a lower spar having a U-shaped profile with a bottom and two lateral walls extending upwards from the bottom, where each lateral wall of a spar has a free end extending until it comes into the vicinity of the free end of the lateral wall of the other spar, fixing means for fixing the free end of a lateral wall of one spar to the free end of the lateral wall of the other spar, and a plurality of ribs distributed along the length of the lower spar and housed between the upper spar and the lower spar, where each rib has a top end fixed to each lateral wall of the upper spar and a bottom end fixed to the lower spar, wherein the engine pylon comprises, for each rib, a pad housed in the lower spar and secured thereto, and each pad has a transverse wall which extends transversely with respect to the lower spar and has a fixing zone at which the bottom end of the associated rib is fixed.

Such an engine pylon thus offers a reduced number of component parts and a single row of fixings per side, enabling a saving in weight and in assembly time.

Advantageously, the fixing zone takes the form of a cavity in the transverse wall in which cavity the bottom end of the associated rib is housed.

Advantageously, the top end comprises a web extending transversely with respect to the upper spar and, on each side of the web, a flange secured to the web, and each flange bears against an internal face of a lateral wall of the upper spar and is fixed to the lateral wall.

Advantageously, the lower spar and the pads are made of metal and the upper spar is made of composite materials.

Advantageously, the upper spar is shaped to form an aerodynamic exterior fairing.

According to one particular embodiment, an internal face of the free end of each lateral wall of the upper spar bears against an external face of the free end of a lateral wall of the lower spar, in the region where a lateral wall of the upper spar is superposed on a lateral wall of the lower spar, the lateral walls have coaxial through-bores passing through them, and the fixing means comprise, for each pair of coaxial through-bores, a shanked fastener which has a shank that is inserted into the through-bores and a head at each end of the shank so as to sandwich the lateral walls.

According to one particular embodiment, the free end of each lateral wall of the upper spar is butted against the free end of a lateral wall of the lower spar, the free end of each lateral wall has through-bores passing through it, the fixing means comprise, on the one hand, for each pair of butted-together lateral walls a fishplate placed against an external face of each lateral wall of the pair, where each fishplate has, for each through-bore of the associated pair, a complementary through-bore coaxial with the through-bore and, on the other hand, for each through-bore a shanked fastener which has a shank that is inserted into the through-bore and into the coaxial complementary through-bore and a head at each end of the shank so as to sandwich the associated fishplate and lateral wall.

According to one particular embodiment, the free end of each lateral wall of the lower spar has a plurality of housings where each has a contact wall roughly (+/−10 degrees) perpendicular to the associated lateral wall of the upper spar, the edge face of the free end of each lateral wall is positioned against the contact walls of the associated housings, each contact wall has a through-bore of which the axis is roughly (+/−10 degrees) parallel to the associated lateral wall of the upper spar, for each through-bore, the associated lateral wall of the upper spar has a first bore of which the axis is perpendicular to the axis of the through-bore and a second bore coaxial with the through-bore and opening into the first bore, and the fixing means comprise, for each through-bore, a sleeve nut housed in the first bore and a screw of which the shank passes successively through the through-bore, and the coaxial second bore to screw into the sleeve nut in the associated first bore.

The invention also proposes an aircraft comprising a wing, a jet engine and an engine pylon according to one of the preceding variants, fixed between the wing and the jet engine.

BRIEF DESCRIPTION OF THE DRAWINGS

The abovementioned features of the invention, together with others, will become more clearly apparent from reading the following description of one exemplary embodiment, the description being given in connection with the attached drawings, among which.

DETAILED DESCRIPTION OF THE PREFERRED EMBODIMENTS

Figure 1:
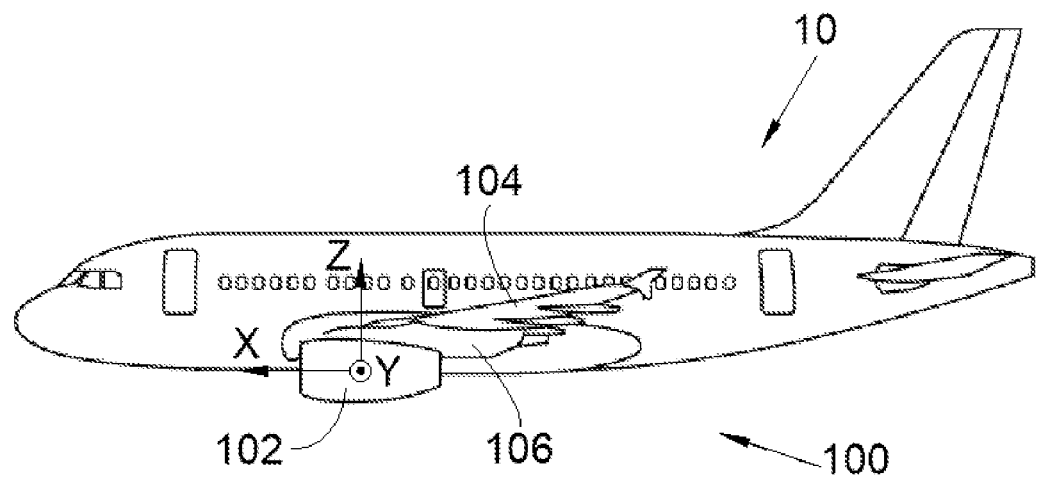
FIG. 1 is a side view of an aircraft according to the invention.

FIG. 1 shows an aircraft 10 which comprises a propulsion system 100 with a jet engine 102 fixed to a wing 104 of the aircraft 10 by means of an engine pylon 106 according to the invention.

In the description that follows, terms relating to a position are considered with reference to an aircraft in the normal flying position, which is to say as depicted in FIG. 1, and "front" and "rear" positions are considered with respect to the front and the rear of the jet engine and with respect to the direction of forward travel of the aircraft 10 when the jet engine 102 is in operation.

In the description that follows and by convention, X is the name given to the longitudinal direction of the jet engine which is parallel to the longitudinal axis of the jet engine, Y is the name given to the transverse direction which is horizontal when the aircraft is on the ground, and Z is the vertical direction which is vertical when the aircraft is on the ground, these three directions X, Y and Z being mutually orthogonal.

The jet engine 102 has a revolution shape about its longitudinal axis and is surrounded by a nacelle made up of panels forming an aerodynamic exterior surface. Likewise, the wing 104 has a structure surrounded by a skin forming an aerodynamic exterior surface.

The engine pylon 106 forms a rigid structure.

Figure 2:
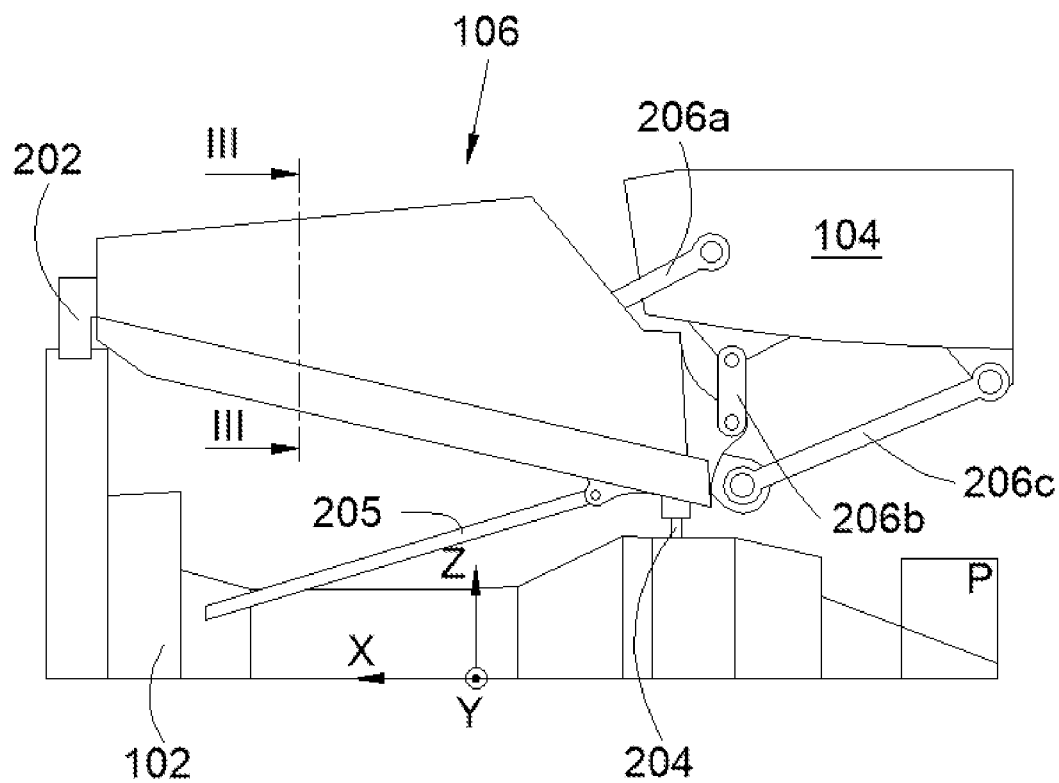
FIG. 2 is a side view of an engine pylon according to the invention and assembled between a wing and a jet engine.

FIG. 2 shows an example of an installation of the engine pylon 106 according to the invention without the exterior fairings between the wing 104 without the skin and the jet engine 102 without the nacelle.

The engine pylon 106 takes the form of a box structure which is fixed between the jet engine 102 and the wing 104.

In the embodiment of the invention that is depicted here, the engine pylon 106 is fixed to the jet engine 102 by first connecting means comprising a front engine mount 202, a rear engine mount 204 and reaction rods 205 which absorb the thrust forces generated by the jet engine.

In the embodiment of the invention that is depicted here, the engine pylon 106 is fixed to the wing 104 by second connecting means comprising a set of connecting rods 206a-c.

These connecting means are given here by way of example and may adopt other forms known to those skilled in the art.

Figure 3:
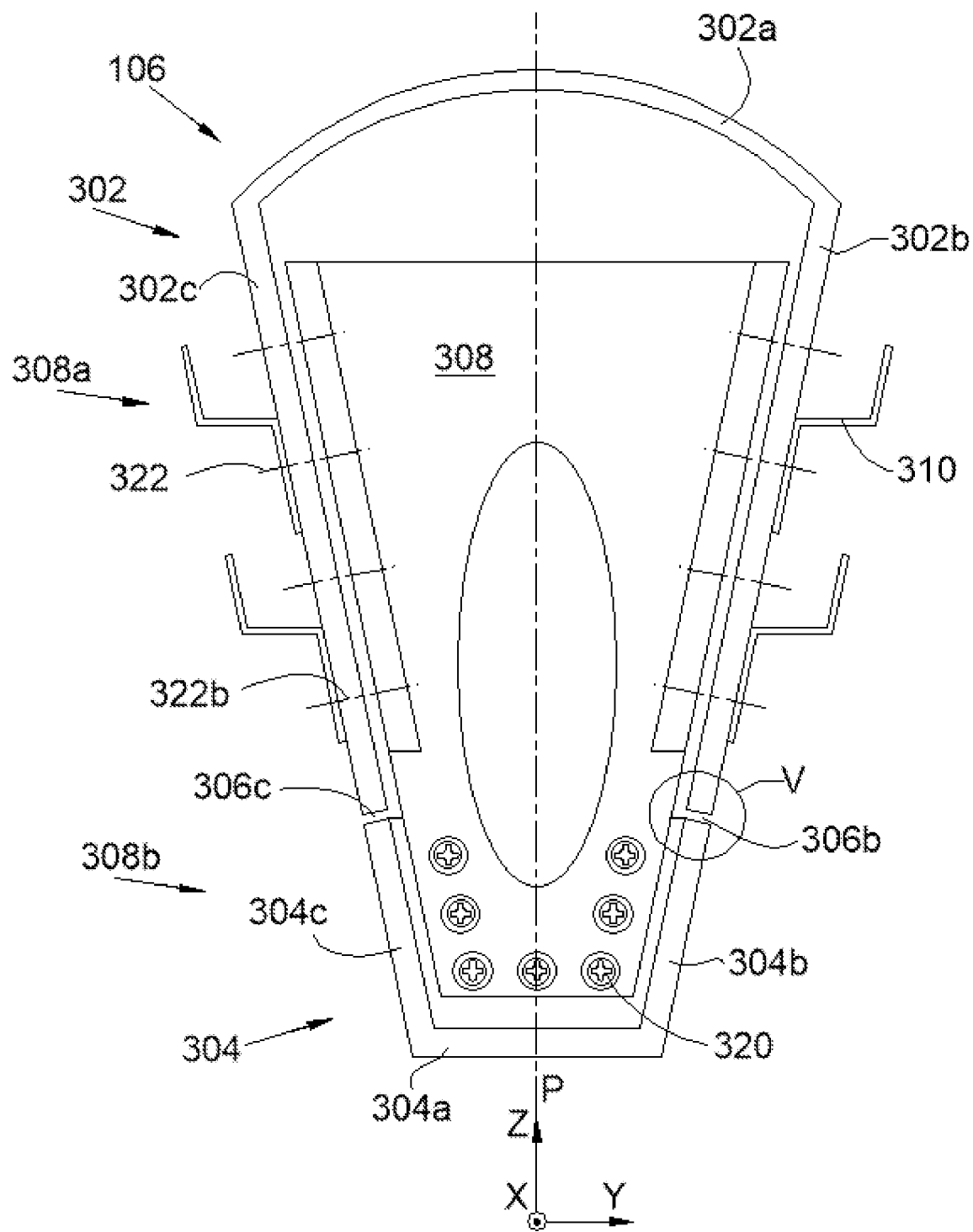
FIG. 3 is a view in section on III-III of the engine pylon of FIG. 2.
Figure 4:
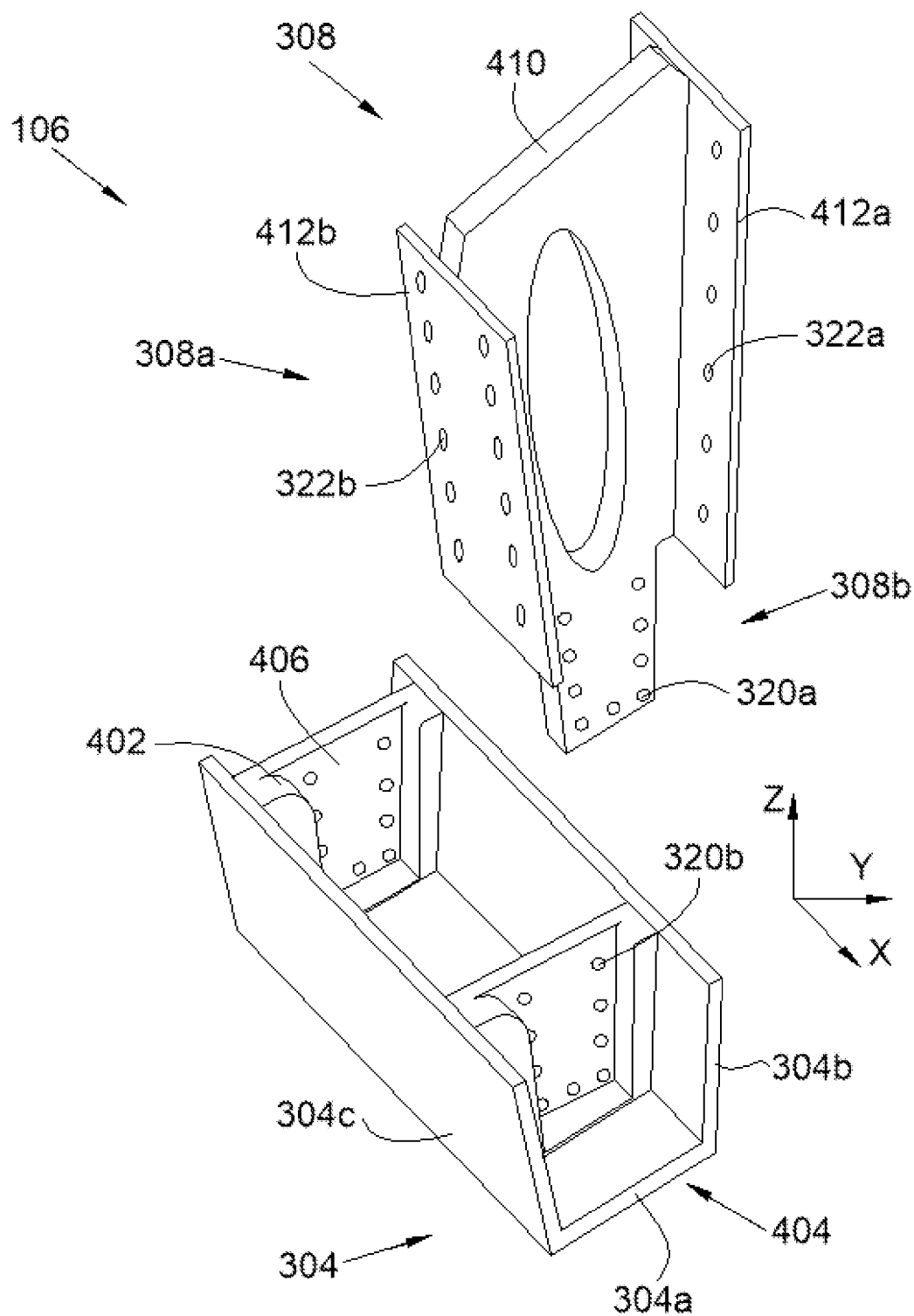
FIG. 4 is an exploded view of a lower spar and of a rib according to the invention.

FIG. 3 shows the engine pylon 106 and FIG. 4 shows certain components for creating the engine pylon 106.

The engine pylon 106 takes the form of a box structure and has a longitudinal midplane P parallel to the plane XZ and passing through the longitudinal axis X of the jet engine 102.

The engine pylon 106 comprises an upper spar 302 extending roughly (+/−10 degrees) parallel to the longitudinal direction X and having, in a plane perpendicular to the longitudinal direction X, an inverted U-shaped profile with a roof 302a and two lateral walls 302b-c which extend downwards from the roof 302a on each side of the longitudinal midplane P. There is thus a port-side lateral wall 302b and a starboard-side lateral wall 302c.

The engine pylon 106 comprises a lower spar 304 extending roughly (+/−10 degrees) parallel to the longitudinal direction X and having, in a plane perpendicular to the longitudinal direction X, a U-shaped profile with a bottom 304a and two lateral walls 304b-c which extend upwards from the bottom 304a on each side of the longitudinal midplane P. There is thus a port-side lateral wall 304b and a starboard-side lateral wall 304c.

Each lateral wall 302b-c, 304b-c of a spar 302, 304 has a free end which extends until it comes into the vicinity of the free end of the lateral wall 304b-c, 302b-c of the other spar 304, 302.

The engine pylon 106 also comprises fixing means for fixing the free end of a lateral wall 302b-c, 304b-c of one spar 302, 304 to the free end of the lateral wall 304b-c, 302b-c of the other spar 304, 302.

Thus, the free end of the port-side lateral wall 302b, or respectively the starboard-side lateral wall 302c, of the upper spar 302 is fixed to the port-side lateral wall 304b, or respectively to the starboard-side lateral wall 304c, of the lower spar 304.

There is therefore one row of fixings per side, namely a first row of fixings 306b for fixing the free ends of the respective lateral walls 302b and 304b and a second row of fixings 306c for fixing the free ends of the respective lateral walls 302c and 304c of the spars 302 and 304 to one another requiring a reduced number of fixing means.

The engine pylon 106 also comprises a plurality of ribs 308 which are housed in the box structure formed by the upper spar 302 and the lower spar 304 and which are distributed along the length of the lower spar 304.

Each rib 308 has a top end 308a which is fixed to each lateral wall 302b-c of the upper spar 302 and a bottom end 308b which is fixed to the lower spar 304.

The ribs 308 connect the upper spar 302 and the lower spar 304 along a plurality of vertical connecting planes distributed along the length of the spars 302 and 304 and give the engine pylon 106 stability and transfer torsional loads (Mx).

Such an engine pylon 106 thus has a reduced number of component parts and a single row of fixings per side, enabling a saving in weight and in assembly time.

FIG. 4 shows an exploded view of the lower spar 304 and of a rib 308.

The engine pylon 106 comprises, for each rib 308, a pad 402 housed in the lower spar 304 and secured thereto. The lower spar 304 and the pad 402 may be one and the same single component or two components fixed together.

Because the ribs 308 are distributed over the length of the lower spar 304, there is also a plurality of pads 402 distributed along the length of the lower spar 304.

In the embodiment of the invention that is depicted in FIGS. 3 and 4, each pad 402 has a transverse wall 406 which extends transversely with respect to the lower spar 304, which is to say, perpendicular to the longitudinal direction X. The transverse wall 406 has a fixing zone 404 at which the bottom end 308b of the associated rib 308 is fixed.

In the embodiment of the invention that is depicted in FIG. 4, the fixing zone 404 takes the form of a cavity in the transverse wall 406 in which cavity the bottom end 308b of the associated rib 308 is housed, but in another embodiment which has not been depicted, the transverse wall 406 may be planar and the fixing zone 404 is then the planar surface of the transverse wall 406. In the embodiment of the invention that has been depicted in FIGS. 3 and 4, the fixing of the bottom end 308b of the rib 308 is performed using bolts or rivets 320 through bores 320a-b parallel to the longitudinal direction X and provided for this purpose through the bottom end 308b of the rib 308 and through the transverse wall 406.

In the embodiment of the invention that has been depicted in FIGS. 3 and 4, the top end 308a of the rib 308 comprises a web 410 extending transversely with respect to the upper spar 302, which is to say, perpendicular to the longitudinal direction X, and on each side of the web 410 with respect to the longitudinal midplane P, a flange 412a-b secured to the web 410, and each flange 412a-b bears against the internal face of a lateral wall 302b-c of the upper spar 302 and is fixed to the lateral wall 302b-c.

In the embodiment of the invention that is depicted in FIGS. 3 and 4, each flange 412a-b is fixed by means of bolts or rivets 322 through bores 322a-b perpendicular to the lateral wall 302b-c concerned and provided for that purpose in the flange 412a-b and the lateral wall 302b-c of the upper spar 302.

Because of the presence of the jet engine 102 below the lower spar 304 and the pads 402, these latter components are subjected to very high temperatures. In order to be able to withstand these temperatures, the lower spar 304 and the pads 402 need to be made from a material able to withstand these high temperatures and they are preferably made of metal.

Likewise, the ribs 308 are preferably made of metal in order to withstand the high temperatures in the vicinity of the bottom ends 308b and in order to withstand the forces passing through them.

Conversely, the upper spar 302 is subjected to lower temperatures and it is therefore possible to produce the upper spar 302 from a less weighty material and this is made, for example, of composite materials such as CFRP (carbon fiber reinforced polymer).

Such a structure enables the lightening of the engine pylon 106.

Because of its structure being made of composite materials, the upper spar 302 can be given a complex shape. Such a complex shape makes it possible to create an aerodynamic exterior fairing which offers an aerodynamic exterior surface and forms the exterior fairing of the engine pylon 106 providing the connection between the nacelle of the jet engine 102 and the skin of the wing 104, unlike in the prior art where an additional exterior fairing is needed.

The upper spar 302 thus acts as the primary structure, aimed at transferring load, and as the secondary structure, aimed at aerodynamically cladding the primary structure and housing the systems therein.

If the upper spar 302 is unable to constitute the aerodynamic exterior fairing, clips 310 are fixed to the outside of each lateral wall 302b-c of the upper spar 302 onto which to attach an additional aerodynamic exterior fairing (which is not depicted in the figures).

An assembly method enables the creation of two modules which are then fixed to one another along rows of fixings 306b-c, allowing simple rapid assembly.

A first module is made up of the upper spar 302 and of the clips 310, if present, and a second module is made up of the lower spar 304 and of the ribs 308 fixed in place by their bottom ends 308b.

The two modules are then fixed together by fitting fixing means and by fixing the top end 308a of the ribs 308 to the upper spar 302.

Figure 5:
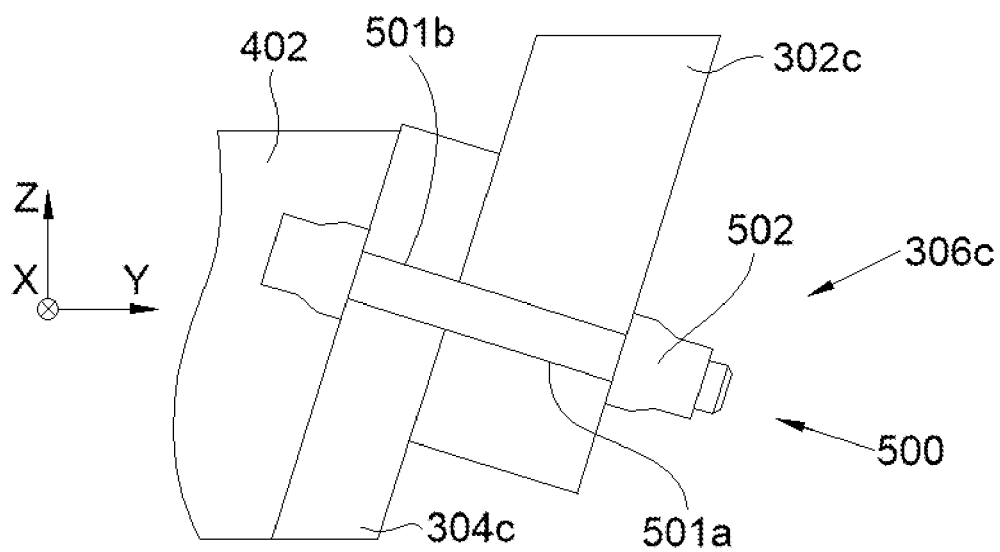
FIG. 5 is a view of assembly detail V of FIG. 3 according to a first embodiment of the invention.
Figure 6:
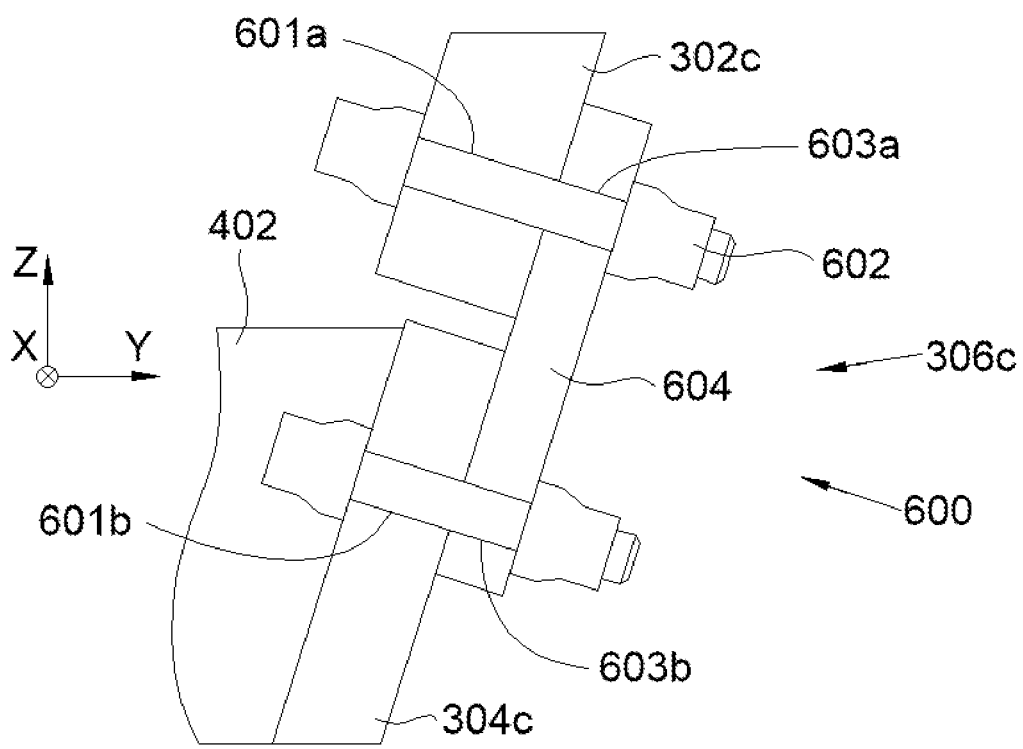
FIG. 6 is a view of assembly detail V of FIG. 3 according to a second embodiment of the invention.
Figure 7:
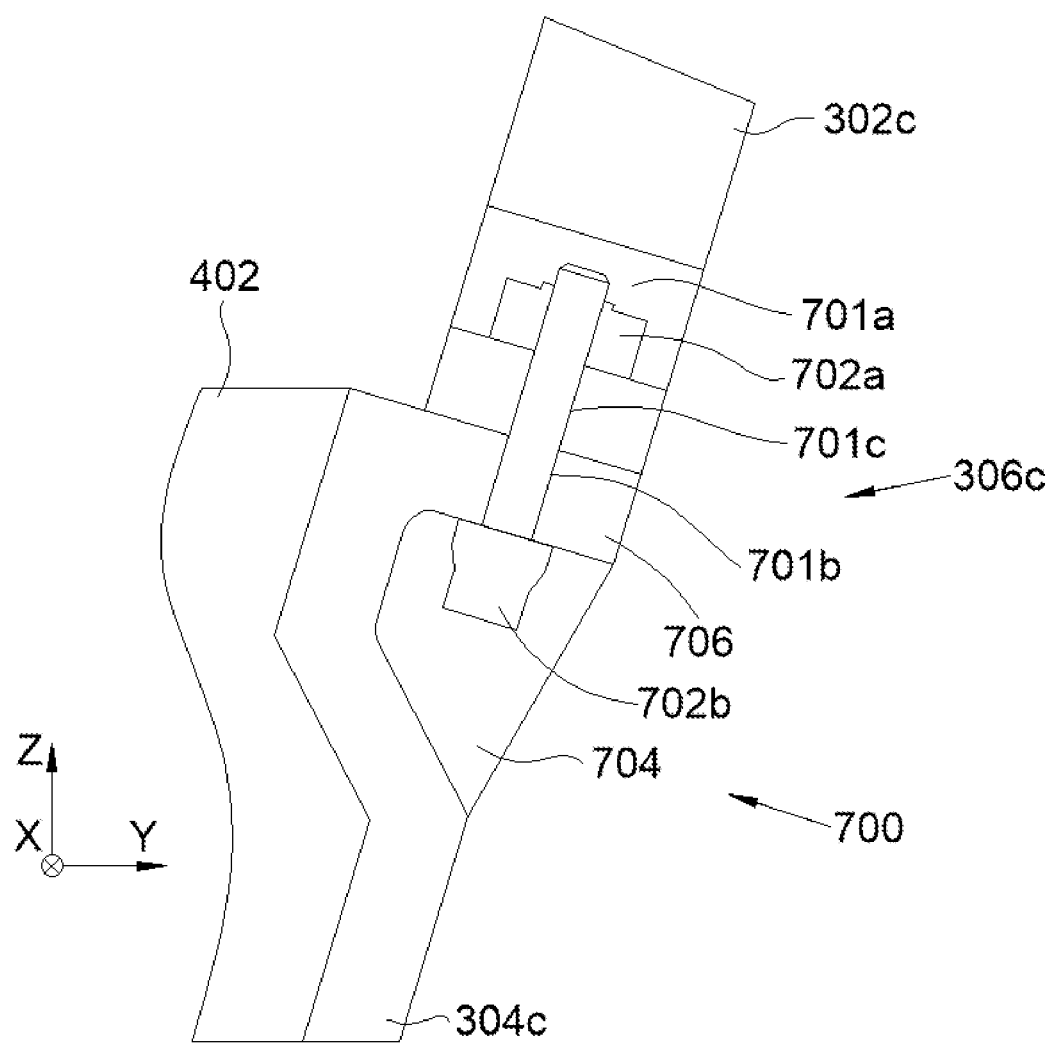
FIG. 7 is a view of assembly detail V of FIG. 3 according to a third embodiment of the invention.

FIGS. 5 to 7 show various embodiments of the fixing means along the row of fixings 306c (the two rows of fixings 306b-c are identical).

In the embodiment of FIG. 5, an internal face of the free end of each lateral wall 302b-c of the upper spar 302 bears against an external face of the free end of a lateral wall 304b-c of the lower spar 304. The internal face is the face that faces towards the inside of the engine pylon 106 and the external face is the face that faces towards the outside of the engine pylon 106.

In the region where a lateral wall 302b-c of the upper spar 302 is superposed on a lateral wall 304b-c of the lower spar 304, the lateral walls 302b-c and 304b-c have, passing through them, coaxial through-bores 501a-b distributed along the length of the spars 302 and 304.

The fixing means 500 comprise, for each pair of coaxial through-bores 501a-b, a shanked fastener 502 which has a shank that is inserted into the through-bores 501a-b and a head at each end of the shank so as to sandwich the lateral walls 302b-c and 304b-c. The shanked fasteners 502 are, for example, bolts or rivets. The sandwiching is between the head of the screw and the nut in the case of a bolt, or between the head and the headed tail in the case of a rivet.

In the embodiment of FIG. 6, the free end of each lateral wall 302b-c of the upper spar 302 is butted against the free end of a lateral wall 304b-c of the lower spar 304.

The free end of each lateral wall 302b-c, 304b-c has passing through it through-bores 601a-b that are distributed along the length of the spar 302, 304.

The fixing means 600 comprise, for each pair of butted-together lateral walls 302b-c, 304b-c, a fishplate 604 which is placed against an external face of each lateral wall 302b-c, 304b-c of the pair. The external face is the face facing towards the outside of the engine pylon 106.

Each fishplate 604 has, for each through-bore 601a-b of the associated pair, a complementary through-bore 603a-b coaxial with the through-bore 601a-b.

The fixing means 600 comprise, for each through-bore 601*a-b*, a shanked fastener 602 which has a shank that is inserted into the through-bore 601*a-b* and the coaxial complementary through-bore 603*a-b* and a head at each end of the shank so as to sandwich the associated fishplate 604 and lateral wall 302*b-c*, 304*b-c*. The shanked fasteners 602 are, for example, bolts or rivets. The sandwiching is between the head of the screw and the nut in the case of a bolt or between the head and the headed tail in the case of a rivet.

In the embodiment of FIG. 7, the free end of each lateral wall 304*b-c* of the lower spar 304 has a plurality of housings 704 distributed along the length of the lower spar 304 where each housing 704 has a contact wall 706 which is roughly (+/−10 degrees) perpendicular to the associated lateral wall 302*b-c* of the upper spar 302, which is to say, is on the same side as and constitutes the free end of the lower spar 304.

The edge face of the free end of each lateral wall 302*b-c* of the upper spar 302 is placed against the contact walls 706 of the associated housings 704.

Each contact wall 706 has a through-bore 701*b* of which the axis is roughly (+/−10 degrees) parallel to the associated lateral wall 302*b-c* of the upper spar 302.

For each through-bore 701*b*, the associated lateral wall 302*b-c* of the upper spar 302 has a first bore 701*a* of which the axis is perpendicular to the axis of the through-bore 701*b* and a second bore 701*c* coaxial with the through-bore 701*b* and opening into the first bore 701*a*.

The fixing means 700 comprise, for each through-bore 701*b*, a sleeve nut 702*a* (also known as a tube nut or a barrel nut) housed in the first bore 701*a* and a screw 702*b* of which the shank passes successively through the through-bore 701*b*, and the coaxial second bore 701*c* to screw into the sleeve nut 702*a* in the associated first bore 701*a*.

The contact wall 706 and the lateral wall 302*b-c* of the upper spar 302 are thus sandwiched between the head of the screw 702*b* and the sleeve nut 702*a* which collaborate with one another.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An engine pylon for mounting a jet engine beneath a wing of an aircraft, the engine pylon comprising:
    an upper spar having an inverted U-shaped profile with a roof and two lateral walls extending downwards from the roof,
    a lower spar having a U-shaped profile with a bottom and two lateral walls extending upwards from the bottom, where each lateral wall of one of the upper spar or the lower spar has a free end extending until the respective lateral wall comes into a vicinity of a respective free end of each lateral wall of the other of the upper spar or the lower spar,
    fixing means configured to fix the free end of a lateral wall of one of the upper spar or the lower spar to the free end of the lateral wall of the other of the upper spar or the lower spar, and
    a plurality of ribs distributed along a length of the lower spar and housed between the upper spar and the lower spar, where each rib has a top end fixed to each lateral wall of the upper spar and a bottom end fixed to the lower spar,
    wherein the engine pylon comprises, for each rib, a pad housed in the lower spar and secured thereto, and
    wherein each pad has a transverse wall which extends transversely with respect to the lower spar and has a fixing zone at which the bottom end of an associated rib is fixed, and each pad extends transversely from a first lateral wall of the lower spar to a second lateral wall of the lower spar.

2. The engine pylon according to claim 1, wherein the fixing zone is formed as a cavity in the transverse wall, in which cavity a bottom end of an associated rib is housed.

3. The engine pylon according to claim 1,
    wherein the top end comprises a web extending transversely with respect to the upper spar and, on each side of the web, a flange secured to the web, and
    wherein each flange bears against an internal face of a lateral wall of the upper spar and is fixed to said lateral wall.

4. The engine pylon according to claim 1,
    wherein the lower spar and the pads are made of metal, and
    wherein the upper spar is made of composite materials.

5. The engine pylon according to claim 4, wherein the upper spar is shaped to form an aerodynamic exterior fairing.

6. The engine pylon according to claim 1,
    wherein the free end of each lateral wall of the upper spar is butted against the free end of a lateral wall of the lower spar,
    wherein the free end of each lateral wall has through-bores passing through the free end,
    wherein the fixing means comprise, for each pair of butted-together lateral walls, a fishplate placed against an external face of each lateral wall of the pair, where each fishplate has, for each through-bore of the associated pair, a complementary through-bore coaxial with said through-bore and, for each through-bore, a shanked fastener which has a shank that is inserted into the through-bore and into the coaxial complementary through-bore and a head at each end of the shank so as to sandwich the associated fishplate and lateral wall.

7. The engine pylon according to claim 1,
    wherein the free end of each lateral wall of the lower spar has a plurality of housings where each has a contact wall roughly perpendicular to the associated lateral wall of the upper spar,
    wherein an edge face of the free end of each lateral wall is positioned against the contact walls of associated housings,
    wherein each contact wall has a through-bore, of which an axis of the through bore is roughly parallel to an associated lateral wall of the upper spar,
    wherein, for each through-bore, the associated lateral wall of the upper spar has a first bore of which an axis is perpendicular to the axis of said through-bore and a second bore coaxial with said through-bore and opening into the first bore, and wherein the fixing means comprise, for each through-bore, a sleeve nut housed in the first bore and a screw of which a shank passes successively through the through-bore, and the coaxial second bore to screw into the sleeve nut in the associated first bore.

8. An aircraft comprising
a wing,
a jet engine, and
an engine pylon according to claim 1, fixed between the wing and the jet engine.

9. An engine pylon for mounting a jet engine beneath a wing of an aircraft, the engine pylon comprising:
an upper spar having an inverted U-shaped profile with a roof and two lateral walls extending downwards from the roof,
a lower spar having a U-shaped profile with a bottom and two lateral walls extending upwards from the bottom, where each lateral wall of a first spar of the upper spar and the lower spar has a free end extending until the lateral wall comes into a vicinity of a free end of a lateral wall of a second spar of the upper spar and the lower spar,
fixing means configured to fix the free end of a lateral wall of one spar to the free end of the lateral wall of the other spar, and
a plurality of ribs distributed along a length of the lower spar and housed between the upper spar and the lower spar, where each rib has a top end fixed to each lateral wall of the upper spar and a bottom end fixed to the lower spar,
wherein the engine pylon comprises, for each rib, a pad housed in the lower spar and secured thereto, and
wherein each pad has a transverse wall which extends transversely with respect to the lower spar and has a fixing zone at which the bottom end of an associated rib is fixed,
wherein an internal face of the free end of each lateral wall of the upper spar bears against an external face of the free end of a lateral wall of the lower spar,
wherein, in a region where a lateral wall of the upper spar is superposed on a lateral wall of the lower spar, the lateral walls have coaxial through-bores passing through them, and
wherein the fixing means comprise, for each pair of coaxial through-bores, a shanked fastener which has a shank that is inserted into said through-bores and a head at each end of the shank so as to sandwich the lateral walls.

* * * * *